United States Patent
Horita et al.

(10) Patent No.: US 10,487,912 B2
(45) Date of Patent: Nov. 26, 2019

(54) TORSIONAL VIBRATION DAMPER

(71) Applicant: TOYOTA JIDOSHA KABUSHIKI KAISHA, Toyota-shi, Aichi-ken (JP)

(72) Inventors: Shuhei Horita, Numazu (JP); Hiroyuki Amano, Susono (JP); Yuji Suzuki, Kariya (JP); Yu Miyahara, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/959,440

(22) Filed: Apr. 23, 2018

(65) Prior Publication Data

US 2018/0306271 A1  Oct. 25, 2018

(30) Foreign Application Priority Data

Apr. 24, 2017 (JP) .................. 2017-085545

(51) Int. Cl.
*F16F 15/14* (2006.01)
*F16F 15/315* (2006.01)
*F16D 3/12* (2006.01)

(52) U.S. Cl.
CPC ........ *F16F 15/145* (2013.01); *F16F 15/3153* (2013.01); *F16D 3/12* (2013.01)

(58) Field of Classification Search
CPC ..... F16H 2045/0221; F16H 2045/0226; F16H 2045/0263; F16C 17/10; F16F 15/14; F16F 15/1407; F16F 15/145; F16F 15/1457; F16F 15/1464; F16F 15/1471; F16F 15/1485; F16F 15/16; F16F 15/165; F16F 15/167; F16F 15/173; F16F 15/20; F16F 15/22; F16F 15/223; F16F 15/28
See application file for complete search history.

(56) References Cited

U.S. PATENT DOCUMENTS

2015/0167778 A1  6/2015  Kuehnle et al.
2017/0175851 A1  6/2017  Horita et al.

FOREIGN PATENT DOCUMENTS

| CN | 106170639 A | 11/2016 | |
|---|---|---|---|
| JP | 2000145750 A | 5/2000 | |
| JP | 2013185598 A * | 9/2013 | |
| JP | 2013185598 A | 9/2013 | |
| JP | 5928515 B2 | 6/2016 | |
| WO | 2013117840 A1 | 8/2013 | |
| WO | WO-2015151060 A1 * | 10/2015 | ............ F16F 15/145 |
| WO | 2015185056 A1 | 12/2015 | |
| WO | 2016015725 A1 | 2/2016 | |

OTHER PUBLICATIONS

Machine Translation of JP 2013-185598, obtained Aug. 21, 2018.*
Toyota Technical Publication No. 24127, Torsional Vibration Damping Device, 3 pages.

* cited by examiner

*Primary Examiner* — Richard W Ridley
*Assistant Examiner* — Brian J McGovern
(74) *Attorney, Agent, or Firm* — Hunton Andrews Kurth LLP

(57) ABSTRACT

A torsional vibration damper in which vibration damping performance is ensured by preventing a contact between a rolling mass and a rotary member. A rolling mass includes a trunk penetrating through a bore. A first corner formed in an axial end of the trunk is rounded. A rotary member includes a second corner formed in the bore. an axial length of the first corner of the rolling mass is longer than an axial length of the second corner of the rotary member.

13 Claims, 10 Drawing Sheets

TORSIONAL VIBRATION DAMPER

The present disclosure claims the benefit of Japanese Patent Application No. 2017-085545 filed on Apr. 24, 2017 with the Japanese Patent Office, the disclosure of which is incorporated herein by reference in its entirety.

BACKGROUND

Field of the Disclosure

The present disclosure relates to the art of a device for damping torsional vibrations utilizing reciprocating motion or oscillating motion of an inertial mass.

Discussion of the Related Art

A rotary member such as a drive shaft for transmitting torque generated by a prime mover is vibrated by pulsation of input torque or load torque by driving a member connected to the rotary member. That is, torsional vibration is caused on the rotary member by such torque pulse. Publication of Japanese patent No. 5928515 describes one example of an apparatus for reducing this kind of torsional vibration. In the torsional vibration reducing apparatus of Japanese patent No. 5928515, a rolling body is oscillated by torque pulse along an inner surface of a chamber to damp torsional vibration on a rotating body. According to the teachings of Japanese patent No. 5928515, the rolling body has an H-shaped cross-section, and a first flange portion and a second flange portion of the rolling body have different configurations.

According to the teachings of Japanese patent No. 5928515, specifically, a curvature of a corner between an outer circumferential surface of a shaft portion and an inner surface of the first flange portion and a curvature of a corner between the outer circumferential surface of the shaft portion and an inner surface of the second flange portion are differentiated from each other. Therefore, during oscillation of the rolling body, an axial force acting on the corner between the shaft portion and the first flange portion and an axial force acting on the corner between the shaft portion and the second flange portion are differentiated from each other. For this reason, even when the rolling body makes reciprocal motion in the axial direction of the rotating body due to the above-described axial force, the reciprocal motion is less likely to be repeated in a constant cycle, and thus the rolling body can be suppressed from being resonated.

In the torsional vibration reducing apparatus of Japanese patent No. 5928515, detachment of the rolling body from the chamber can be prevented by the flange portions sandwiching the rotating body. However, when the flange portion is brought into contact to the rotating body by the axial force, the reciprocating motion of the rolling body may be hindered by sliding resistance acting between the flange portion and the rotating body. Consequently, vibration damping performance of the torsional vibration reducing apparatus may be reduced.

SUMMARY

Aspects of preferred embodiments of the present application have been conceived noting the foregoing technical problems, and it is therefore an object of the present disclosure is to provide a torsional vibration damper in which vibration damping performance is ensured by preventing a contact between a rolling mass and a rotary member.

The embodiment of the present disclosure relates to a torsional vibration damper comprising: a rotary member that is rotated by a torque; a bore that is formed on the rotary member; and a rolling mass that is oscillated along a raceway surface of the bore by a rotation of the rotary member. According to the embodiment of the present disclosure, the rolling mass includes a trunk penetrating through the bore, a first corner formed in any one of an axial end of the trunk in which an outer diameter of the trunk increases gradually toward an axial end, and a flange portion formed on axially outer side of the first corner whose outer diameter is larger than an opening width of the bore. The rotary member includes a second corner formed in the bore in which an opening width of the bore increases gradually toward a radially outer side. The second corner includes a radially outer corner at which a thickness of the rotary member is maximum thickness. The first corner includes an opposing point that is to be opposed to the radially outer corner of the rotary member in an axial direction when the rolling mass is oscillated along a raceway surface of the bore. An axial length between a starting point of the first corner and the opposing point in the rolling mass is longer than an axial length of the second corner in the rotary member.

In a non-limiting embodiment, the first corner may include a first curved surface, and the second corner may include a chamfered portion and a second curved surface.

In a non-limiting embodiment, the first corner may include an inclined corner surface that is inclined at a predetermined angle with respect to a rotational center axis of the rotary member, and the second corner may include a chamfered portion and a second curved surface.

In a non-limiting embodiment, the flange portion may include an inner surface connected to the first corner, and the inner surface may include an inclined surface that is inclined at a predetermined angle with respect to the rotational center axis of the rotary member.

In a non-limiting embodiment, a curvature radius of the first curved surface may be set within a range from 0.2 mm to 2.0 mm.

In a non-limiting embodiment, an inclination angle of the inclined corner surface with respect to the rotational center axis of the rotary member and an inclination angle of the inclined surface with respect to the rotational center axis of the rotary member may be different from each other.

In a non-limiting embodiment, the inclination angle of the inclined corner surface is smaller than the inclination angle of the inclined surface.

In a non-limiting embodiment, the inclination angle of the inclined surface may be set within a range from 45 degrees to 85 degrees.

In a non-limiting embodiment, the inclination angle of the inclined corner surface may be set within a range from 1 degree to 84 degrees.

In a non-limiting embodiment, the inclination angle of the inclined corner surface may be set within a range from 10 degrees to 50 degrees.

In a non-limiting embodiment, the inclination angle of the inclined corner surface may be set to 45 degrees.

In a non-limiting embodiment, the flange portion and the first corner may be formed on both axial sides of the trunk. In addition, the rolling mass may comprise: a first piece having a cylindrical shaft portion serves as the trunk, an insertion hole formed in the cylindrical shaft portion, and the flange portion formed integrally with the cylindrical shaft portion; and a second piece having the flange portion, and a shaft portion protruding from the flange portion to be inserted into the insertion hole of the first piece.

In a non-limiting embodiment, a configuration of the first corner of one of axial ends of the trunk and a configuration of the first corner of the other one of axial ends of the trunk may be different from each other.

According to the embodiment of the present disclosure, when the rolling mass is displaced in the axial direction toward the rotary member by vibrations or the like, the flange portion is isolated away from the rotary member by an axial thrust force established as a result of contact between the second corner and the first corner. That is, the rolling mass can be prevented from being contacted to the rotary member during rotation of the rotary member 18. According to the embodiment of the present disclosure, therefore, sliding resistance between the flange portion of the rolling mass and the rotary member can be eliminated. For this reason, the rolling mass is allowed to oscillate smoothly.

Further, since the rolling mass is allowed to oscillate smoothly, a designed vibration damping performance of the torsional vibration damper can be ensured while limiting damages on the rotary member and the rolling mass. In addition, it is possible to prevent generation of collision noise and abrasion powder.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
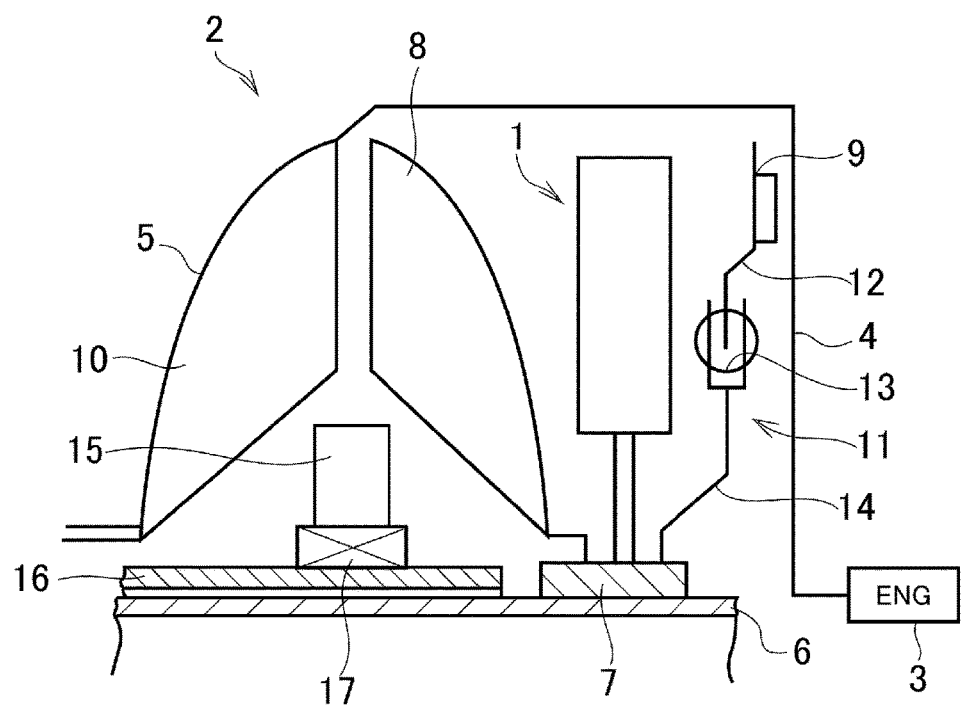
FIG. 1 is a schematic illustration showing the torque converter including the torque vibration damping device according to the embodiment of the present disclosure.

Preferred embodiments of the present application will now be explained with reference to the accompanying drawings. In FIG. 1, there is schematically shown a torque converter 2 having a torsional vibration damper 1 according to the embodiment. A front cover 4 extending from an engine 3 is connected to a pump shell 5 to form a housing of the torque converter 2, and an input shaft 6 of a not shown transmission penetrates through a center axis of the housing. A turbine hub 7 is fitted onto the input shaft 6 to be rotated integrally therewith while being connected to a turbine runner 8, a lockup clutch 9, and the torsional vibration damper 1.

As known in the conventional art, the turbine runner 8 is opposed to a pump impeller 10 to be rotated by a spiral oil flow created by the pump impeller 10. The lockup clutch 9 is hydraulically engaged with an inner face of the front cover 4 to enable torque transmission, and the torque transmission is interrupted by reducing hydraulic pressure applied to the lockup clutch 9 to withdrawn the lockup clutch 9 from the front cover 4. The lockup clutch 9 is also connected to the turbine hub 7 through a lockup damper 11 adapted to absorb vibrations elastically by a coil spring. Specifically, the lockup damper 11 comprises a drive member 12 connected to the lockup clutch 9 and a driven member 14 connected not only to the drive member 12 through a coil spring 13 but also to the turbine hub 7. Both of the drive member 12 and driven member 14 are annular plate members. A stator 15 is disposed between the pump impeller 10 and the turbine runner 8 in an inner circumferential side of those members. The stator 15 is engaged to a fixed shaft 16 also fitted onto the input shaft 6 through a one-way clutch 17.

Figure 2:
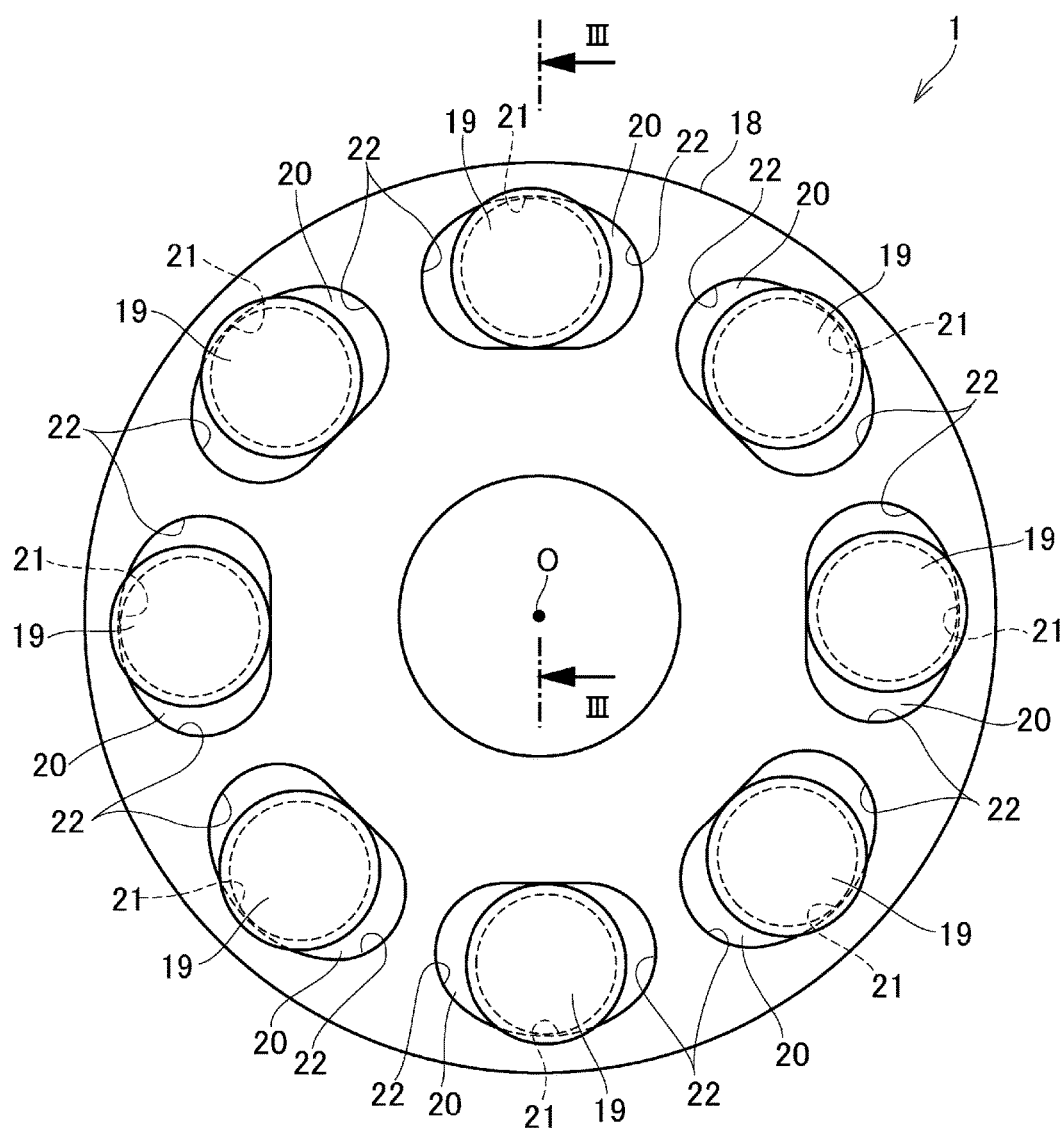
FIG. 2 is a front view showing one example of the vibration damper.

The torsional vibration damper 1 is disposed between the turbine runner 8 and the lockup clutch 9 or the lockup damper 11. A structure of the torsional vibration damper 1 is schematically shown in FIG. 2. The torsional vibration damper 1 comprises a rotary member 18 as a circular plate fitted onto a crankshaft of the engine 3, a propeller shaft that delivers power to a wheel, or an axle (neither of which are shown) to be rotated integrally therewith. In the rotary member 18, a plurality of bores 20 are formed in a circular manner around a rotational center O at even intervals, in other words, symmetrically with respect to the rotational center O. A rolling mass 19 is held, respectively, in each of the bore 20.

Each of the bores 20 is individually formed to penetrate through the rotary member 18 in a thickness direction, and for example, individually shaped into a kidney-shape that allows the rolling mass 19 to be oscillated by pulsation of the torque applied to the rotary member 18. Instead, the bore 20 may also be shaped into a jellybean-shape or an exact circle. A radially outer portion of an inner circumferential edge of the bore 20 serves as a raceway surface 21 on which the rolling mass 19 rolls. Specifically, the raceway surface 21 is curved inwardly so that a curvature radius of the raceway surface 21 is shorter than that of rotary member 18. In the bore 20, the rolling mass 19 is allowed to oscillate between lateral ends 22 of the inner circumferential edge of the bore 20.

Figure 3:
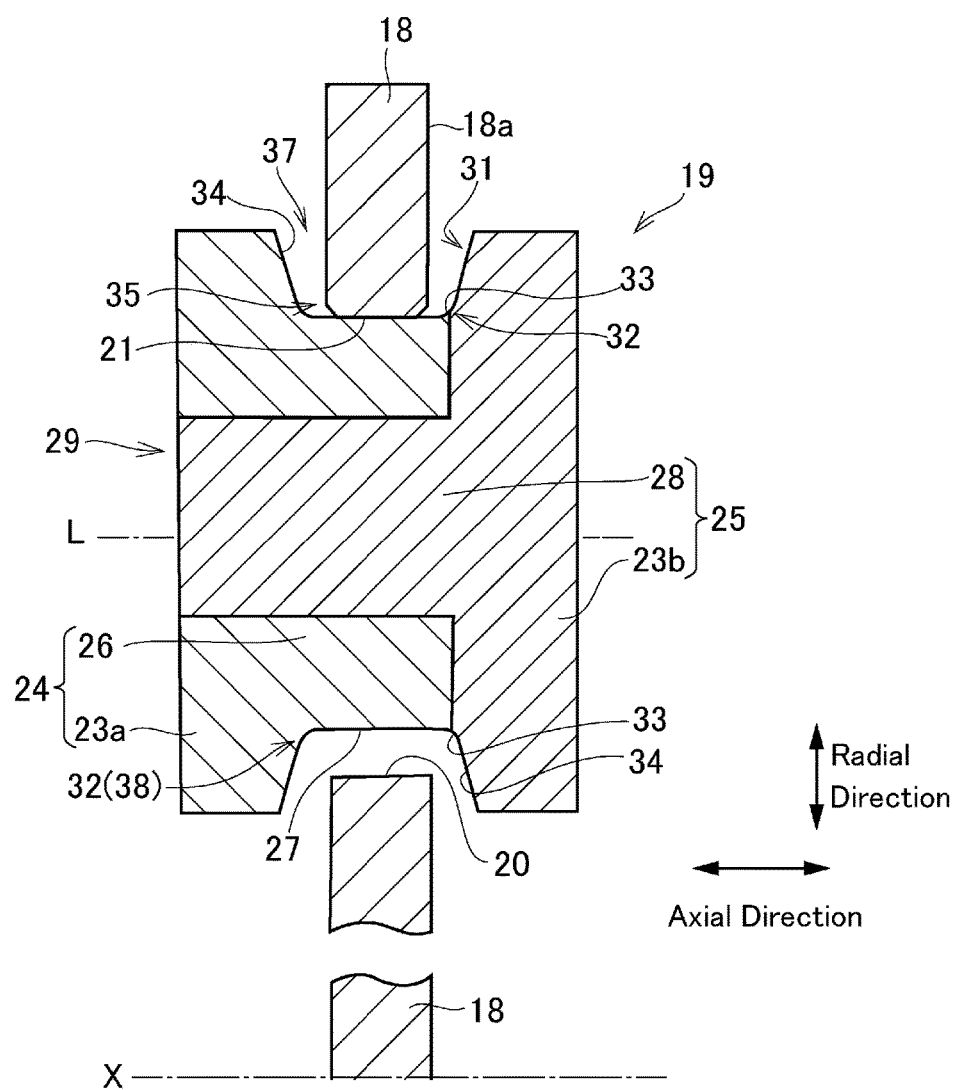
FIG. 3 is a cross-sectional view showing a cross-section of the torsional vibration damper according to the embodiment along the line III-III in FIG. 2.

A structure of the rolling mass 19 is shown in FIG. 3. As illustrated in FIG. 3, the rolling mass 19 is a column or cylindrical member having an H-shaped cross-section. According to the embodiment, the rolling mass 19 is formed by combining a female member 24 as a first piece and a male member 25 as a second piece. Specifically, the rolling mass 19 comprises a trunk 26 as a diametrically-smaller cylindrical shaft portion of the female member 24, and a pair of diametrically-larger flange portions 23a, 23b formed on both sides of the trunk 26. When the rotary member 18 is rotated, an outer circumferential face 27 of the trunk 26 is centrifugally brought into contact to the raceway surface 21, and an inner surface 31 of the flange portion 23a of the female member 24 and an inner surface 31 of the flange portion 23b of the male member 25 are respectively brought into contact to the rotary member 18 to prevent detachment of the rolling mass 19 from the bore 20. Thus, the rolling mass 19 is held partially in the bore 20. In order to allow the rolling mass 19 to smoothly oscillate in the bore 20, an outer diameter of the trunk 26 of the rolling mass 19 is set to be slightly smaller than a clearance between the raceway surface 21 and a radially inner portion of the inner circumferential edge of the bore 20.

In order not to disturb an oscillating motion of the rolling mass 19 by oil, a radially outer portion of the rotary member 18 where the rolling masses 19 are held in the bores 20 is covered liquid-tightly by a pair of annular casings (not shown) from both sides of the rotary member 18.

As described, when the rotary member 18 is rotated, the outer circumferential face 27 of the trunk 26 is centrifugally pushed onto the raceway surface 21 of the bore 20, and the outer diameter of the trunk 26 is smaller than the clearance between the raceway surface 21 and the radially inner portion of the inner circumferential edge of the bore 20. In this situation, therefore, a radially innermost portion of the trunk 26 is isolated away from the radially inner portion of the inner circumferential edge of the bore 20 as illustrated in FIG. 3.

Specifically, the female member 24 comprises the above-mentioned flange portion 23a serving as the trunk 26 of the rolling mass 19, and the cylindrical shaft portion protruding from the flange portion 23a toward the male member 25 to penetrate through the bore 20. That is, a length of the trunk 26 in an axial direction is longer than a thickness of the rotary member 18. An outer diameter of the flange portion 23a is larger than an opening width of the bore 20.

On the other hand, the male member 25 comprises the above-mentioned flange portion 23b, and a shaft portion 28 protruding from the flange portion 23b to be inserted into an insertion hole 29 of the cylindrical shaft portion (i.e., the trunk 26) of the female member 24. Specifically, a length of the shaft portion 28 in the axial direction is substantially identical to a total axial length of the cylindrical shaft portion and the flange portion 23a of the female member 24, and an outer diameter of the shaft portion 28 is substantially equal to or slightly smaller than an inner diameter of the cylindrical shaft portion of the female member 24. An outer diameter of the flange portion 23a is also larger than an opening width of the bore 20. In the rolling mass 19 thus structured, the flange portion 23a of the female member 24 and the flange portion 23b of the male member 25 are opposed to each other across the trunk 16. Alternatively, the rolling mass 19 may also be divided into more than two pieces such as a flange portion, a trunk portion and another flange portion. Further, any one of the flange portions may be omitted as necessary.

Thus, in the torsional vibration damper 1, the rolling masses 19 are held respectively in the bore 20. When the rotary member 18 is rotated, the outer circumferential face 27 of the trunk 26 of each of the rolling masses is individually pushed onto the raceway surface 21 of each of the bores 20 by the centrifugal force. In this situation, each of the rolling masses 19 is oscillated in the bore 20 by pulsation of the torque applied to the rotary member 18. Consequently, torsional vibrations on the shaft to on which the torsional vibration damper 1 is mounted caused by such pulsation of the torque are damped or absorbed by the rolling masses 19 thus oscillated.

During oscillation of the rolling mass 19, the rolling mass 19 is inevitably inclined or reciprocated in the axial direction by a disturbance such as vibrations of the engine 3. Consequently, the flange portion 23a or 23b of the rolling mass 19 are brought into contact to a circular face 18a of the rotary member 18. In this situation, the reciprocating motion of the rolling mass 19 may be hindered by sliding resistance acting between the flange portion 23a or 23b and the circular face 18a of the rotary member 18. As a result, vibration damping performance of the torsional vibration damper 1 may be reduced. In order to avoid such reduction in the vibration damping performance of the torsional vibration damper 1, according to the embodiment, each of the rolling masses 19 has a configuration such that the flange portions 23a and 23b are prevented from being contacted to the circular face 18a of the rotary member 18.

Figure 4:
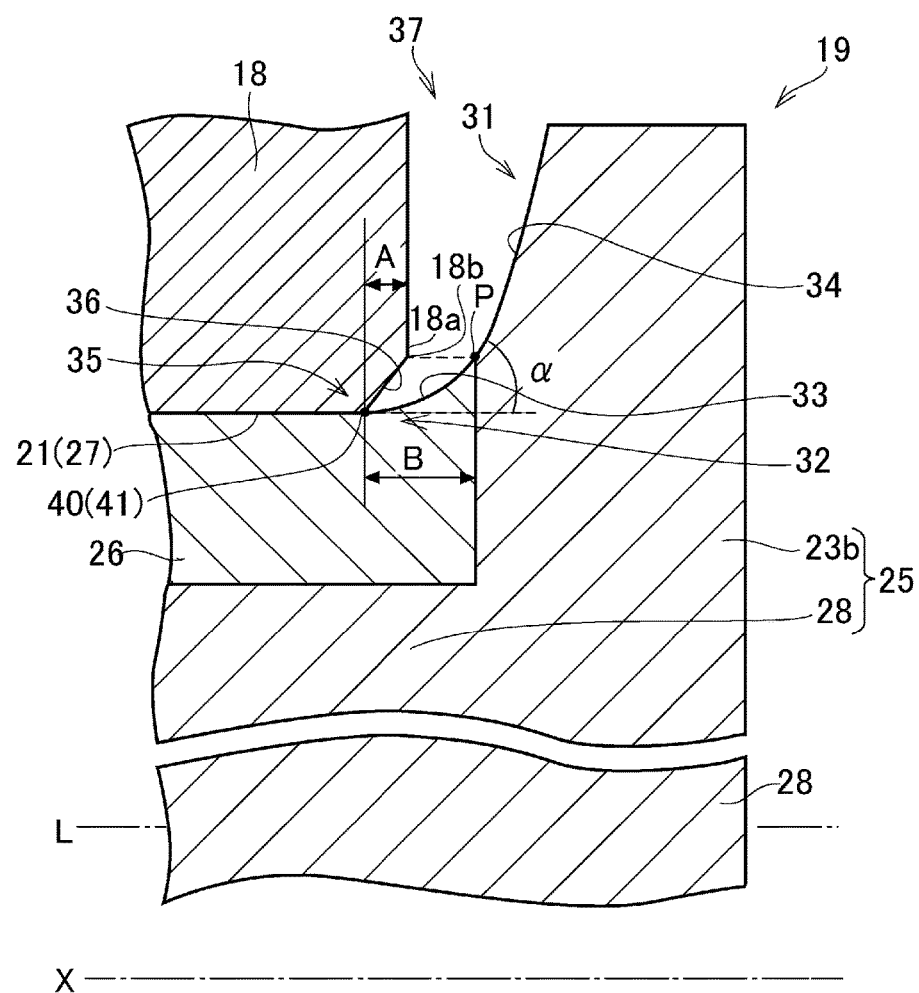
FIG. 4 is a partial cross-sectional view showing the rotary member and the rolling mass according to the first example.

A first example of the configuration to prevent a contact between the flange portions 23a and 23b of the rolling mass 19 and the rotary member 18 is shown in FIG. 4. According to the first example, in the rolling mass 19, a first corner 32 between the outer circumferential face 27 of the trunk 26 and the inner surface 31 of the flange portion 23a or 23b is rounded to form a curved surface 33 as a first curved surface, and an inclined surface 34 is formed on the inner surface 31 of the flange portion 23a or 23b from the curved surface 33 in such a manner as to reduce thickness of the flange portion 23a or 23b toward a radially outer end. On the other hand, in the rotary member 18, a second corner 35 between the raceway surface 21 of the bore 20 and the circular face 18a is chamfered to form a chamfered portion 36. In the torsional vibration damper 1 according to the first example, therefore, a relief area 37 is created between the circular face 18a of the rotary member 18 and the inclined surface 34 of the rolling mass 19. For this reason, the inclined surface 34, that is, the inner surface 31 of the flange portion 23a or 23b of the rolling mass 19 will not be brought into contact to the circular face 18a of the rotary member 18, even when the rolling mass 19 is vibrated in the axial direction.

In the torsional vibration damper 1 according to the first example, the above-explained configuration of the first corner 32 may be applied not only to the female member 24 but also to the male member 25. Likewise, the above-explained configuration of the second corner 35 may be applied to each corner between the raceway surface 21 and the circular face 18a in the axial direction. Therefore, in the following descriptions, only the configuration of the male member 25 side will be explained with reference to FIGS. 4 to 9, and the flange portion 23a or 23b of the rolling mass 19 will also be simply called the flange portion 23. In the curved surface 33 formed in the first corner 32, specifically, an outer diameter of the trunk 26 increases gradually toward the flange portion 23, that is, toward the axial end. In other words, a center of curvature of the curved surface 33 in the first corner 32 is situated radially outer side of the trunk 26. On the other hand, in the chamfered portion 36 formed in the second corner 35, an opening width of the bore 20 increases gradually toward the radially outer side. In other words, a distance from a radially center line L of the bore 20 to the raceway surface 21 increases gradually in the chamfered portion 36.

In the first example, a thickness A of the chamfered portion 36 is defined as a distance between: a radially inner corner 40 between the raceway surface 21 and the chamfered portion 36; and a radially outer corner 18 between the chamfered portion 36 and the circular face 18a of the rotary member 18b. That is, in the second corner 35, a thickness of the rotary member 18 becomes the maximum thickness at the radially outer corner 18b. On the other hand, an axial width B of the curved surface 33 is defined as an axial distance between: a starting point 41 corresponding to the radially inner corner 40 of the chamfered portion 36; and an opposing point P to be opposed to the radially outer corner 18b of the chamfered portion 36 when the outer circumferential face 27 of the trunk 26 is centrifugally pushed onto the raceway surface 21 of the bore 20. As can be seen from FIG. 1, according to the first example, the axial width B of the curved surface 33 is set to be wider than the thickness A of the chamfered portion 36. In other words, an axial length B of the first corner 32 is longer than an axial length A of the second corner 35.

Thus, the first corner 32 includes the opposing point P opposing to the radially outer corner 18b of the chamfered portion 36, and the second corner 35 includes the radially inner corner 40 as a starting point of the chamfered portion 36, and the radially outer corner 18b as an end point of the chamfered portion 36. In addition, the axial width of the curved surface 33 of the first corner 32 is wider than the axial width of the chamfered portion 36 of the second corner 35. Further, a distance between the circular face 18a of the rotary member 18 and the inclined surface 34 of the flange portion 23 becomes shortest at a level where the radially outer corner 18b and the opposing point P are situated.

Since the axial length B is longer than the axial length A, the relief area 37 is maintained between the circular face 18a of the rotary member 18 and the inner surface 31 of the flange portion 23. In addition, since the inclined surface 34 is formed on the inner surface 31, the relief area 37 becomes wider toward the radially outer side. In the torsional vibration damper 1, therefore, the flange portion 23 of the rolling mass 19 will not be brought into contact to the circular face 18a of the rotary member 18 even when the rolling mass 19 is vibrated in the axial direction.

Specifically, the curved surface 33 of the first corner 32 is formed in such a manner as to have a curvature radius from 0.2 mm to 2.0 mm, and to have an inclination angle α of the inclined surface 34 of the flange portion 23 with respect to the outer circumferential face 27 of the trunk 26 from 45 degrees to 85 degrees. On the other hand, for example, an inclination angle of the chamfered portion 36 of the second corner 35 is set to 45 degrees, and a width of the chamfered portion 36 between the radially inner corner 40 and the radially outer corner 18b is set within 1 mm. If the inclination angle α of the inclined surface 34 is smaller than 45 degrees, a cut amount of the rolling mass 19 is increased excessively and hence a mass of the rolling mass 19 would be too light to ensure the vibration damping performance. By contrast, if the inclination angle α of the inclined surface 34 is greater than 85 degrees, the flange portion 23 may collide into the circular face 18a of the rotary member 18.

Specifically, when the rolling mass 19 is subjected to the vibrations to be displaced toward the rotary member 18, an axial thrust force is applied to the rolling mass 19 as a result of contact between the chamfered portion 36 and the curved surface 33 so that the flange portion 23 is isolated away from the circular face 18a of the rotary member 18. Therefore, the sliding resistance will not act between the flange portion 23 of the rolling mass 19 and the circular face 18a of the rotary member 18. In other words, when the rolling mass 19 is subjected to the vibrations to be displaced toward the rotary member 18 while being pushed centrifugally onto the raceway surface 21, the radially inner corner 40 is stranded on the curved surface 33 of the rolling mass 19. Consequently, the rolling mass 19 is aligned automatically with the rotary member 18 by a component of the centrifugal force established by the curved surface 33 of the rolling mass 19.

Thus, in the torsional vibration damper 1, the flange portion 23 of the rolling mass 19 can be prevented from being contacted to the circular face 18a of the rotary member 18. For this reason, a designed vibration damping performance can be ensured while limiting damages on the rotary member 18 and the rolling mass 19. In addition, it is possible to prevent generation of collision noise and abrasion powder.

In the torsional vibration damper 1, configuration of the first corner 32 of the rolling mass 19 and the second corner of the rotary member 18 may be modified as long as the axial length B of the first corner 32 is longer than the axial length A of the second corner 35. Modification examples of the torsional vibration damper 1 will be explained hereinafter with reference to FIGS. 5 to 9.

Figure 5:
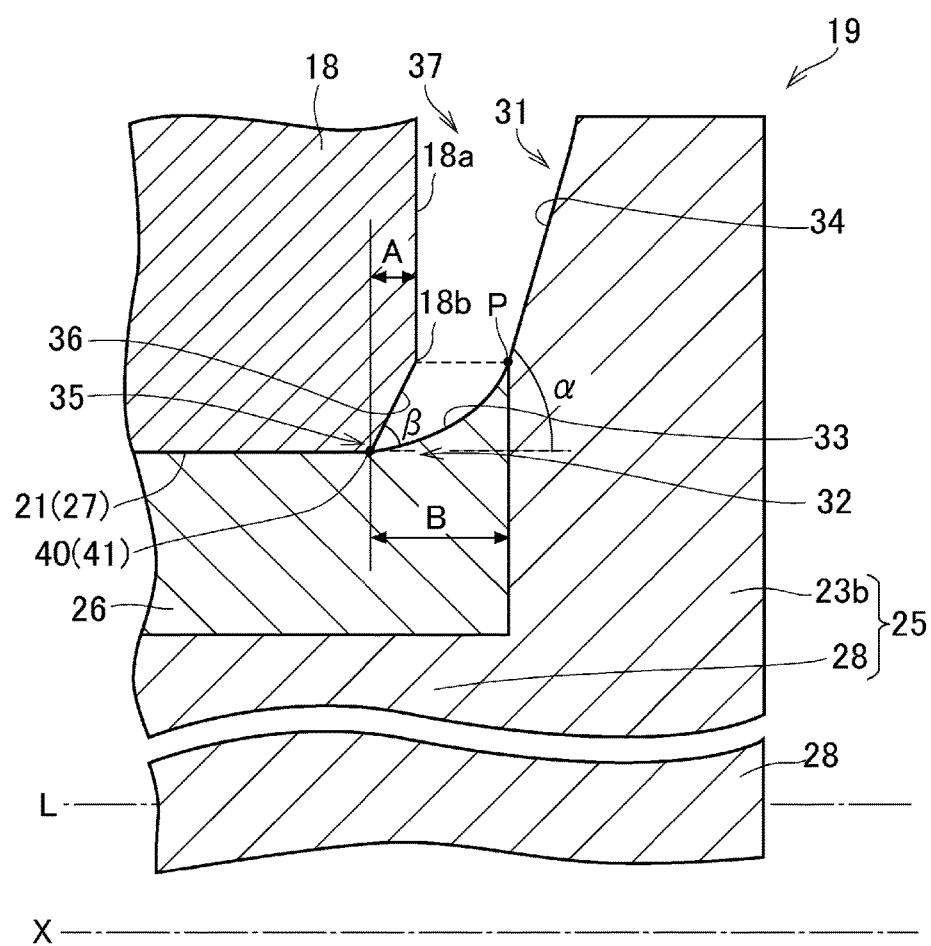
FIG. 5 is a partial cross-sectional view showing the rotary member and the rolling mass according to the second example.

In the second example in which the inclination angle β of the chamfered portion 36 is altered is shown in FIG. 5. Specifically, the inclination angle β of the chamfered portion 36 of the second corner 35 is set to be greater than 45 degrees. According to the second example, therefore, the flange portion 23 of the rolling mass 19 will not be brought into contact to the circular face 18a of the rotary member 18 even when the rolling mass 19 is vibrated in the axial direction.

Figure 6:
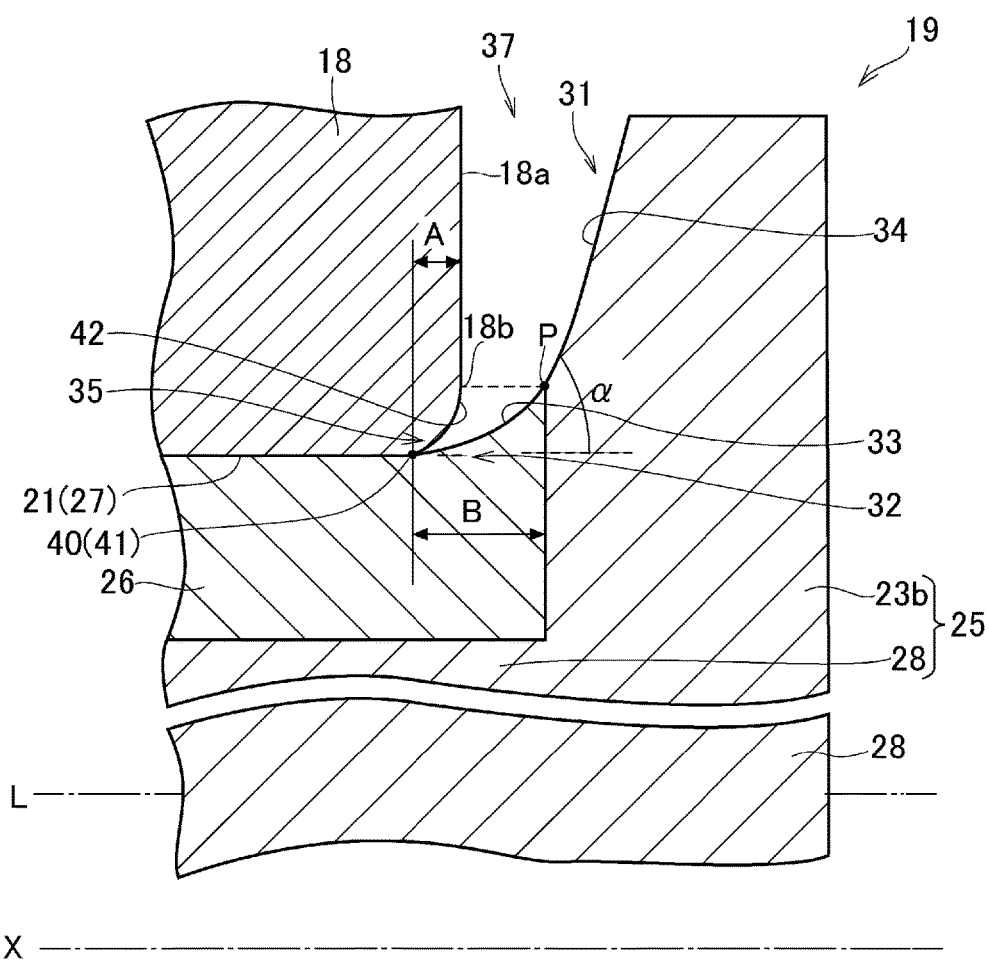
FIG. 6 is a partial cross-sectional view showing the rotary member and the rolling mass according to the third example.

FIG. 6 shows the third example of the torsional vibration damper 1. In the torsional vibration damper 1 according to the third example, the chamfered portion 36 of the second corner 35 may also be formed utilizing a pressed edge created by a press work without cutting the second corner 35 of the rotary member 18. According to the third example, the second corner 35 of the rotary member 18 is shaped into a rounded corner 42 as a second curved surface by the press work. In the torsional vibration damper 1 according to the third example, the thickness A of the rounded corner 42 is also defined as the distance between: the radially inner corner 40 between the raceway surface 21 and the rounded corner 42; and the radially outer corner 18 between the rounded corner 42 and the circular face 18a of the rotary member 18b. As indicated in FIG. 3, the axial width B of the curved surface 33 is also wider than the thickness A of the rounded corner 42. That is, the axial length B of the first corner 32 is also longer than the axial length A of the second corner 25. According to the third example, since the rounded corner 42 is formed only by the press work without requiring the cutting work, a manufacturing cost of the torsional vibration damper 1 can be reduced.

Figure 7:
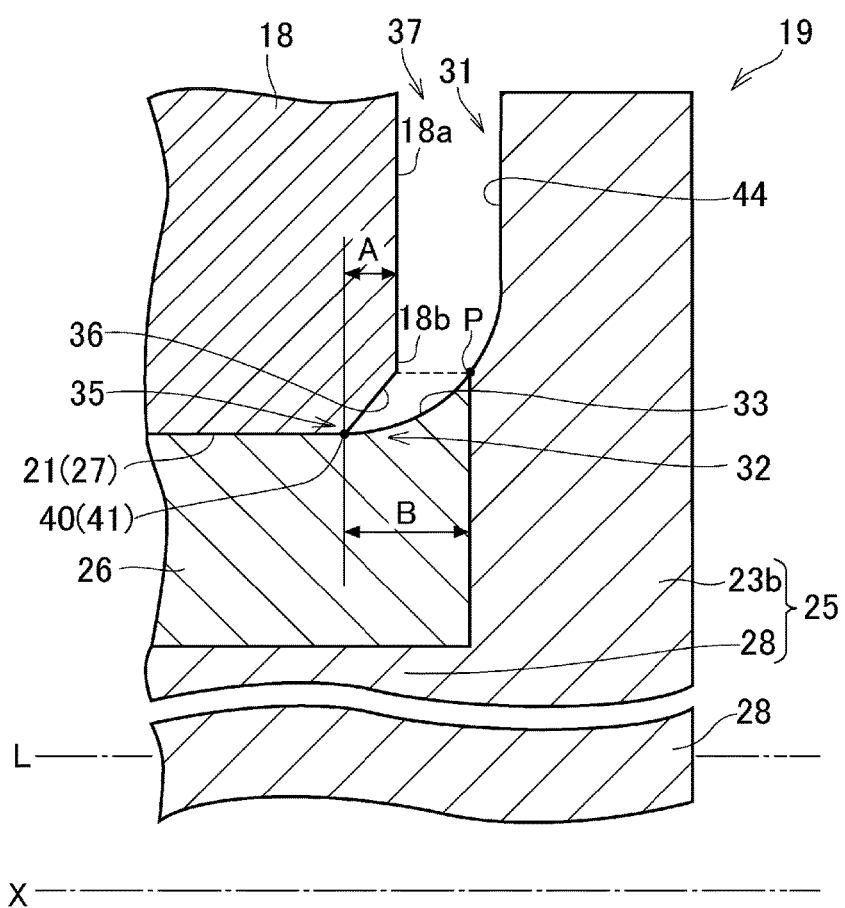
FIG. 7 is a partial cross-sectional view showing the rotary member and the rolling mass according to the fourth example.

FIG. 7 shows the fourth example of the torsional vibration damper 1 as a modification example of the first example shown in FIG. 1. In the fourth example, specifically, the curved surface 33 is also formed in the first corner 32, and a vertical surface 44 extends from the curved surface 33 in the inner surface 31 of the flange portion 23.

Figure 8:
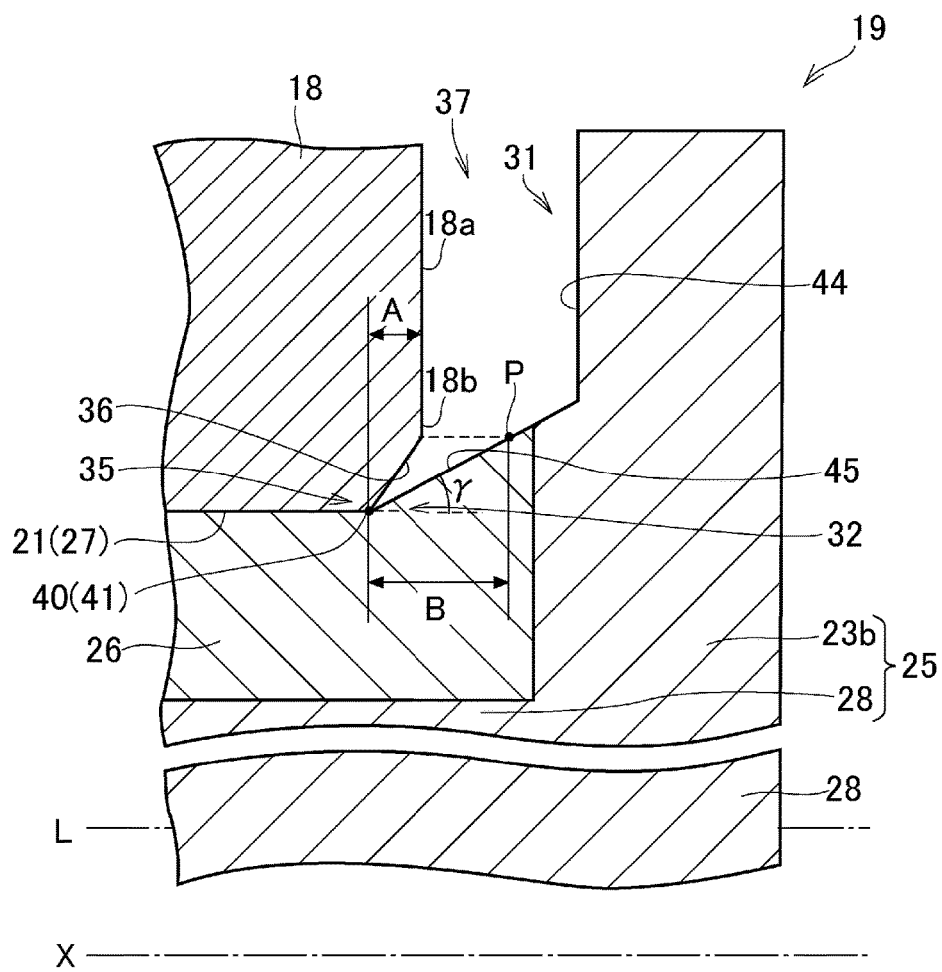
FIG. 8 is a partial cross-sectional view showing the rotary member and the rolling mass according to the fifth example.

FIG. 8 shows the fifth example of the torsional vibration damper 1. According to the fifth example, an inclined corner surface 45 is formed in the first corner 32 instead of the curved surface 33, and the vertical surface 44 extends from the inclined corner surface 45 in the inner surface 31 of the flange portion 23. The inclined corner surface 45 is inclined at a predetermined angle with respect to a rotational center axis X of the rotary member 18. Specifically, the inclined corner surface 45 is formed in such a manner as to have an inclination angle γ with respect to the outer circumferential face 27 of the trunk 26 from 1 degree to 84 degrees.

Figure 9:
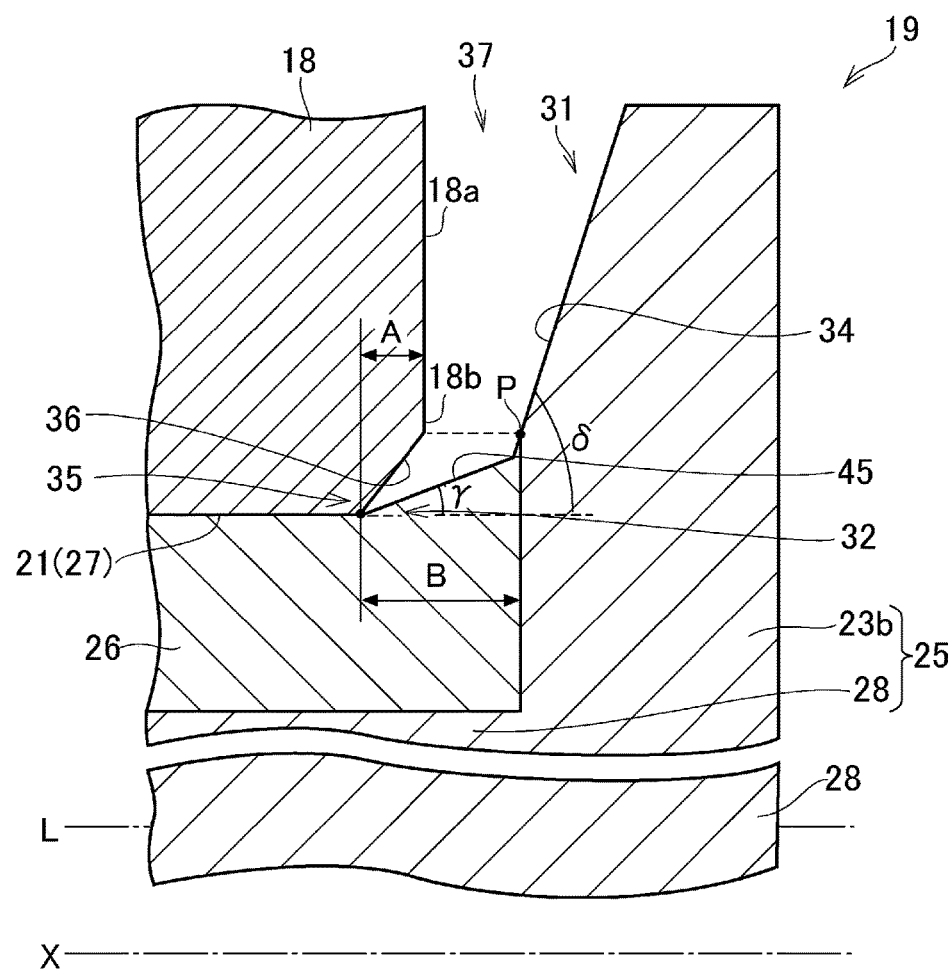
FIG. 9 is a partial cross-sectional view showing the rotary member and the rolling mass according to the sixth example.

FIG. 9 shows the sixth example of the torsional vibration damper 1. According to the sixth example, the inclined corner surface 45 is also formed in the first corner 32 instead of the curved surface 33, and the inclined surface 34 extends from the inclined corner surface 45 in the inner surface 31 of the flange portion 23. According to the sixth example, specifically, the inclined corner surface 45 is formed in such a manner as to have an inclination angle γ with respect to the outer circumferential face 27 of the trunk 26 from 1 degree to 84 degrees. On the other hand, the inclined surface 34 is formed in such a manner as to have an inclination angle δ with respect to the outer circumferential face 27 of the trunk 26 from 45 degrees to 85 degrees. Preferably, the inclination angle γ of the inclined corner surface 45 is set within a range from 10 degrees to 50 degrees. More preferably, the inclination angle γ of the inclined corner surface 45 is set to 45 degrees. Thus, the inclination angle γ of the inclined corner surface 45 and the inclination angle δ of the inclined surface 34 are different from each other. Specifically, the inclination angle γ of the inclined corner surface 45 is smaller than the inclination angle δ of the inclined surface 34. If the inclination angle δ of the inclined surface 34 is smaller than 45 degrees, a cut amount of the rolling mass 19 is increased excessively and hence a mass of the rolling mass 19 would be too light to ensure the vibration damping performance. By contrast, if the inclination angle δ of the inclined surface 34 is greater than 85 degrees, the flange portion 23 may collide into the circular face 18a of the rotary member 18.

Although the above exemplary embodiment of the present application has been described, it will be understood by those skilled in the art that the torsional vibration damper according to the present disclosure should not be limited to the described exemplary embodiment, and various changes and modifications can be made within the scope of the present disclosure. For example, a combination of the configurations of the first corner 32 of the rolling mass 19 and the second corner of the rotary member 18 may be altered arbitrarily as long as the axial distance B is longer than the axial distance A.

That is, in the rolling mass 19 according to the foregoing examples, the flange portion 23a of the female member 24 and the flange portion 23b of the male member 25 are formed symmetrically with each other. However, as shown in FIG. 10, the flange portion 23a of the female member 24 and the flange portion 23b of the male member 25 may also be formed unsymmetrically with each other.

Figure 10:
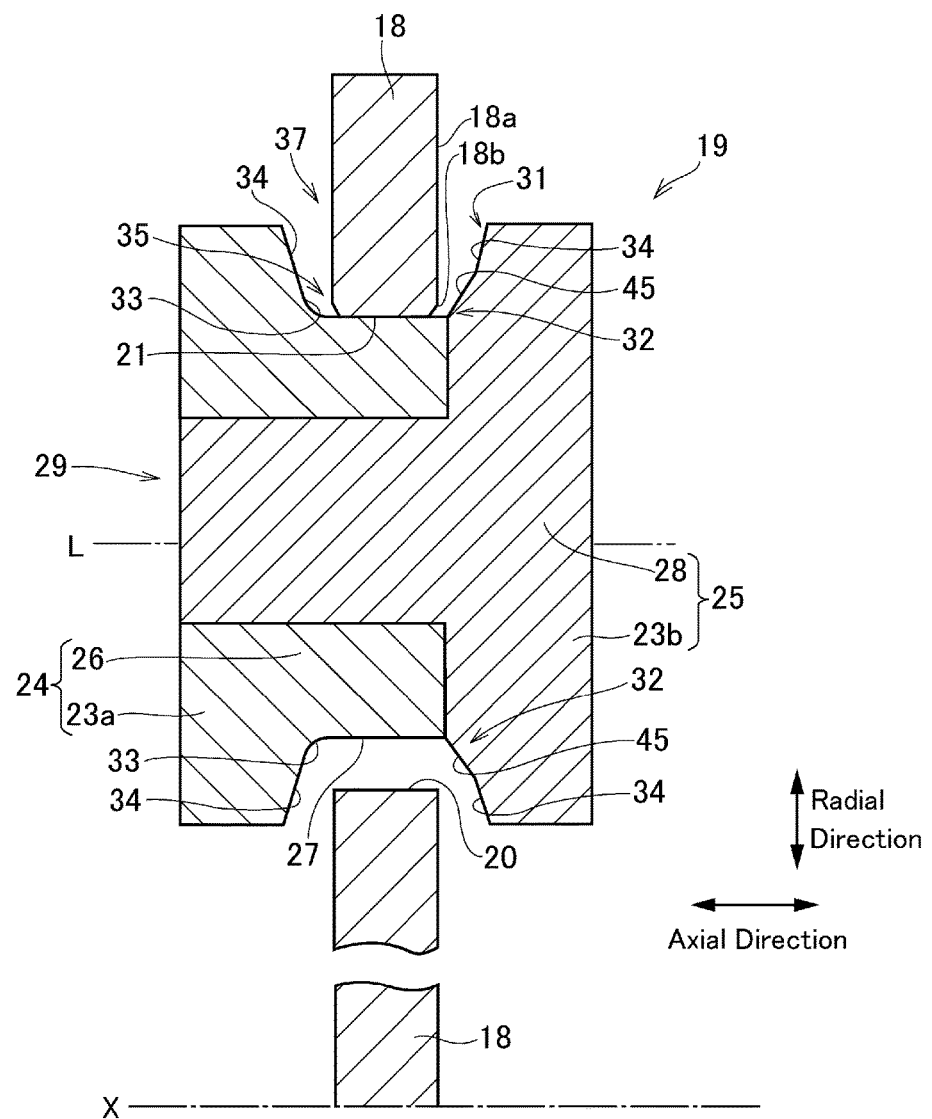
FIG. 10 is a cross-sectional view showing a cross-section of the torsional vibration damper according to another embodiment.

Specifically, in the modification example shown in FIG. 10, the inclined corner surface 45 is formed in the first corner 32 of the male member 25, and the inclined surface 34 extends from the inclined corner surface 45 in the inner surface 31 of the flange portion 23a. On the other hand, in the female member 24, the curved surface 33 is formed in the first corner 32, and the inclined surface 34 extends from the inclined corner surface 45 in the inner surface 31 of the flange portion 23b. According to the modification example shown in FIG. 10, in addition to the advantages achieved by the foregoing examples, it is possible to prevent repetition of reciprocation of the rolling mass 19 in the axial direction thereby preventing an occurrence of resonance.

In addition, the flange portions 23a and 23b may be omitted from the rolling mass 19. In this case, in order to prevent a detachment of the rolling mass 19 from the bore 20 of the rotary member 18, a groove may be formed on a width center of the inner circumferential edge of the bore 20, and a protrusion or key may be formed around the trunk 26 of the rolling mass 19 to be fitted into the groove of the bore 20. In the groove of the bore 20, any of the configurations of the first corner 32 may be applied to each corner of the groove, and any of configurations of the second corner 35 may be applied to each corner of the protrusion or key.

What is claimed is:

1. A torsional vibration damper comprising:
a rotary member that is rotated by a torque;
a plurality of bores that is formed in the rotary member in a circular manner at predetermined intervals, each of the plurality of bores having a respective predetermined length in a circumferential direction;
a rolling mass that is oscillated by pulsation of the torque applied to the rotary member; and
a raceway surface which is formed on a radially outer portion of an inner face of one of the plurality of bores and to which the rolling mass is centrifugally pushed,
wherein the rolling mass includes:
a trunk including a length in an axial direction, the length is longer than a thickness of the rotary member;
a flange portion including an outer diameter that is larger than an opening width of the one of the plurality of bores, the flange portion is formed on at least one side of the trunk; and
a first corner which is formed between an outer circumferential surface of the trunk and an inner surface of the flange portion,
wherein the rotary member includes a second corner which is formed between the raceway surface of the one of the plurality of bores and a side face of the rotary member, and in which a distance from a center line of the one of the plurality of bores increases gradually from the raceway surface to the side face of the rotary member,
wherein the second corner includes a chamfered portion, and a radially inner corner as a starting point of the chamfered portion, and a radially outer corner as an end point of the chamfered portion at which the thickness of the rotary member is a maximum thickness,
wherein the first corner includes an opposing point that is to be opposed to an end point of the rotary member in the axial direction,
wherein an axial length between a starting point of the first corner and the opposing point of the first corner is longer than an axial length between the starting point of the chamfered portion and the end point of the chamfered portion,
wherein the starting point of the first corner is located at a same location as the starting point of the second corner, and
wherein an outer diameter of the first corner increases continuously from the starting point of the first corner to the opposing point of the first corner.

2. The torsional vibration damper as claimed in claim 1, wherein the first corner includes a first curved surface, and the second corner includes a second curved surface.

3. The torsional vibration damper as claimed in claim 2, wherein the inner surface of the flange portion is connected to the first corner, and
the inner surface of the flange portion includes an inclined surface that is inclined at a predetermined angle with respect to a rotational center axis of the rotary member.

4. The torsional vibration damper as claimed in claim 2, wherein a curvature radius of the first curved surface falls within a range from 0.2 mm to 2.0 mm.

5. The torsional vibration damper as claimed in claim 1, wherein the first corner includes an inclined corner surface that is inclined at a predetermined angle with respect to a rotational center axis of the rotary member, and
the second corner includes a second curved surface.

6. The torsional vibration damper as claimed in claim 5, wherein an inclination angle of the inclined corner surface of the first corner with respect to the rotational center axis of the rotary member and an inclination angle of the inner surface of the flange portion with respect to the rotational center axis of the rotary member are different from each other.

7. The torsional vibration damper as claimed in claim 6, wherein the inclination angle of the inclined corner surface of the first corner is smaller than the inclination angle of the inner surface of the flange portion.

8. The torsional vibration damper as claimed in claim 7, wherein the inclination angle of the inner surface of the flange portion falls within a range from 45 degrees to 85 degrees.

9. The torsional vibration damper as claimed in claim 8, wherein the inclination angle of the inclined corner surface of the first corner falls within a range from 1 degree to 84 degrees.

10. The torsional vibration damper as claimed in claim 8, wherein the inclination angle of the inclined corner surface of the first corner falls within a range from 10 degrees to 50 degrees.

11. The torsional vibration damper as claimed in claim 8, wherein the inclination angle of the inclined corner surface of the first corner is set to 45 degrees.

12. The torsional vibration damper as claimed in claim 1, wherein the flange portion and the first corner are both formed on an axial side of the trunk, and wherein the rolling mass comprises:

a first piece having a cylindrical shaft portion which serves as the trunk, an insertion hole formed in the cylindrical shaft portion, and the flange portion formed integrally with the cylindrical shaft portion; and a second piece having the flange portion, and a shaft portion protruding from the flange portion to be inserted into the insertion hole of the first piece.

13. The torsional vibration damper as claimed in claim 12, wherein the at least one side of the trunk includes a first axial side and a second axial side opposite to the first axial side, a configuration of the first corner on the first axial side is different than a configuration of the first corner on the second axial side.

* * * * *